United States Patent
Zhou et al.

(10) Patent No.: US 8,873,602 B2
(45) Date of Patent: Oct. 28, 2014

(54) METHOD AND DEVICE FOR TRANSMITTING SOUNDING REFERENCE SIGNAL IN MULTI-ANTENNA SYSTEM

(71) Applicant: Huawei Technologies Co., Ltd., Guangdong (CN)

(72) Inventors: Mingyu Zhou, Shenzhen (CN); Sha Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/653,088

(22) Filed: Oct. 16, 2012

(65) Prior Publication Data
US 2013/0039386 A1    Feb. 14, 2013

Related U.S. Application Data

(63) Continuation of application No. PCT/CN2011/072857, filed on Apr. 15, 2011.

(30) Foreign Application Priority Data

Apr. 16, 2010    (CN) .......................... 2010 1 0150093

(51) Int. Cl.
| | |
|---|---|
| *H04B 1/7143* | (2011.01) |
| *H04L 5/00* | (2006.01) |
| *H04B 7/06* | (2006.01) |
| *H04B 1/713* | (2011.01) |
| *H04W 72/04* | (2009.01) |

(52) U.S. Cl.
CPC ............ *H04L 5/0048* (2013.01); *H04B 7/0691* (2013.01); *H04L 5/0023* (2013.01)
USPC ........... 375/134; 375/133; 375/132; 375/130; 375/299; 375/295; 370/329; 370/328; 370/310

(58) Field of Classification Search
USPC ................. 375/260, 299, 132, 133, 259, 130; 370/329, 328, 310
See application file for complete search history.

(56) References Cited

U.S. PATENT DOCUMENTS

| | | | |
|---|---|---|---|
| 2009/0316756 A1* | 12/2009 | Ro et al. .......................... | 375/133 |
| 2011/0090862 A1* | 4/2011 | Liang et al. .................... | 370/329 |

(Continued)

FOREIGN PATENT DOCUMENTS

| | | | |
|---|---|---|---|
| CN | 101064546 A | 10/2007 | |
| CN | 101355412 A | 1/2009 | |

(Continued)

OTHER PUBLICATIONS

"SRS Transmission in LTE-A," 3GPP TSG RAN WG1 #59, Nov. 2009, No. R1-094576, 3rd Generation Partnership Project, Jeju, Korea.*

(Continued)

*Primary Examiner* — Chieh M Fan
*Assistant Examiner* — Michelle M Koeth
(74) *Attorney, Agent, or Firm* — Leydig, Voit & Mayer, Ltd.

(57) ABSTRACT

The present invention discloses a method and a device for transmitting sounding reference signal in a multi-antenna system, wherein the method includes acquiring antenna grouping information, and grouping antennas according to the antenna grouping information; and transmitting SRS on the respective antennas, wherein different antenna groups transmit the SRS in different frequency bands at a same moment. With the present invention, the interference with a base station of an adjacent cell in a certain frequency band is enabled to be reduced.

12 Claims, 7 Drawing Sheets

(56) References Cited

U.S. PATENT DOCUMENTS

2011/0105167 A1 5/2011 Pan
2011/0261716 A1* 10/2011 Kim et al. ............... 370/252
2012/0120826 A1 5/2012 Hao

FOREIGN PATENT DOCUMENTS

| CN | 101540631 A | 9/2009 |
|---|---|---|
| CN | 101594633 A | 12/2009 |
| CN | 101610607 A | 12/2009 |
| EP | 2426831 A | 3/2012 |
| WO | 2009154415 A2 | 12/2009 |

OTHER PUBLICATIONS

1st Office Action in corresponding Chinese Patent Application No. 201010150093.8 (Apr. 3, 2013).
Written Opinion of the International Searching Authority in corresponding International Patent Application No. PCT/CN2011/072857 (Jul. 28, 2011).
International Search Report in corresponding International Patent Application No. PCT/CN2011/072857 (Jul. 28, 2011).
Extended European Search Report in corresponding European Patent Application No. 11768448.0 (Jun. 6, 2013).
"The number of DRS/SRS antenna ports for UL," 3GPP TSG RAN WG1 #57, May 2009, No. R1-091813, $3^{rd}$ Generation Partnership Project, Valbonne, France.
"SRS Transmission in LTE-A," 3GPP TSG RAN WG1 #59, Nov. 2009, No. R1-094576, $3^{rd}$ Generation Partnership Project, Valbonne, France.
"Consideration on SRS Configuration for UL MIMO," 3GPP TSG RAN WG1 #60 meeting, Feb. 2010, No. R1-101018, 3rd Generation Partnership Project, Valbonne, France.
"UL SRS Enhancement for LTE-Advanced," 3GPP TSG RAN WG1 Meeting #60bis, Apr. 2010, No. R1-102389, $3^{rd}$ Generation Partnership Project, Valbonne, France.
"SRS Enhancement for LTE-A," 3GPP RAN WG1 #59bis, Jan. 2010, No. R1-100198, $3^{rd}$ Generation Partnership Project, Valbonne, France.

* cited by examiner

METHOD AND DEVICE FOR TRANSMITTING SOUNDING REFERENCE SIGNAL IN MULTI-ANTENNA SYSTEM

CROSS-REFERENCE TO RELATED APPLICATIONS

This application is a continuation of International Patent Application No. PCT/CN2011/072857, filed on Apr. 15, 2011, which claims priority to Chinese Patent Application No. 201010150093.8, filed on Apr. 16, 2010, both of which are hereby incorporated by reference in their entireties.

FIELD OF THE INVENTION

The present invention relates to communication technologies, and more particularly, to a method and a device for transmitting sounding reference signal in a multi-antenna system.

BACKGROUND OF THE INVENTION

In order to realize uplink frequency domain scheduling, a User Equipment (UE, User Equipment) not only transmits a Demodulation Reference Signal (DM RS, Demodulation Reference Signal) on currently used bandwidths, but also needs to transmit a Sounding Reference Signal (SRS, Sounding Reference Signal) to a base station within a wider bandwidth, such that the base station acquires channel states on the respective bandwidths of the UE, and schedules proper time-frequency resources for the UE. To acquire the channel states on the entire bandwidth of a UE, the entire bandwidth usually needs to be divided into multiple frequency bands, and the UE transmits SRS in different frequency bands at different moments.

A UE transmits SRS in different frequency bands at different moments, hence different UEs may transmit SRS in a same frequency band at a same moment, in which case the different UEs may interfere with each other. In order to avoid the interference between UEs, a base station usually configures different orthogonal codes for the respective UEs in a same cell. Thus due to the orthogonality of the codes, even if the respective UEs transmit SRS in a same frequency band at a same moment, they would not interfere with each other.

However, such method can only guaranty that the codes used by the respective UEs in the same cell satisfy the orthogonality, while the codes used by UEs of different cells do not satisfy the orthogonality. As such, one UE transmitting SRS in a frequency band may interfere with the SRS received in the same frequency band by a base station of an adjacent cell. If the UE is close to the base station of the adjacent cell, then the produced interference may be a strong one, which will seriously affect the reception of SRS by the base station of the adjacent cell.

In a multi-antenna system, a UE may transmit signals from multiple antennas (or antenna ports), deteriorating the above-described situation. This is because that, in the related art, in order for a base station to simultaneously obtain the channel states of all the antennas of a same UE in a same frequency band, each antenna of the UE transmits SRS in the same frequency band at a same moment. If a UE is close to a base station of an adjacent cell, the SRS transmitted by all the antennas of the UE will become strong interference to the SRS received by the base station of the adjacent cell in the same frequency band, since the interference with the adjacent cell increases with the increasing of the number of antennas as compared with the situation of a single antenna, which will seriously affect accuracy of detection for SRS transmitted by UE of the base station of the adjacent cell.

SUMMARY OF THE INVENTION

The present invention provides a method and a device for transmitting sounding reference signal in a multi-antenna system, which enable to reduce the interference with a base station of an adjacent cell in a certain frequency band.

The present invention provides solutions as follows.

A method for transmitting sounding reference signal (SRS) in a multi-antenna system, comprises
acquiring antenna grouping information and grouping antennas according to the antenna grouping information; and
transmitting SRS on the respective antennas, wherein different antenna groups transmit the SRS in different frequency bands at a same moment.

A device for transmitting SRS in a multi-antenna system comprises
an antenna grouping unit for acquiring antenna grouping information and grouping antennas according to the antenna grouping information; and
a signal transmitting unit for transmitting SRS on the respective antennas, wherein different antenna groups transmit the SRS in different frequency bands at a same moment.

According to the specific embodiments provided in the present invention, the present invention discloses technical effects as follows.

The present invention groups antennas and the antennas of different groups transmit SRS in different frequency bands at a same moment, therefore, even if interference with a base station of an adjacent cell is caused, only one antenna group would cause the interference, thereby avoiding the situation that all the antennas simultaneously interfere with the base stations of the adjacent cell and reducing the interference with the base station of the adjacent cell in a certain frequency band.

BRIEF DESCRIPTION OF THE DRAWINGS

In order to describe the technical solutions in the embodiments of the present invention or in the related art more clearly, a brief introduction on the drawings which are needed in the embodiments is given below. Obviously, the drawings in the description below are only some of the embodiments of the present invention, based on which other drawings can be obtained by those of ordinary skill in the art without any inventive efforts.

FIGS. 3-1 and 3-2 are schematic drawings illustrating a first frequency hopping rule provided in an embodiment of the present invention;

FIGS. 4-1 and 4-2 are schematic drawings illustrating a second frequency hopping rule provided in an embodiment of the present invention;

FIGS. 5-1 and 5-2 are schematic drawings illustrating another second frequency hopping rule provided in an embodiment of the present invention;

FIGS. 6-1 and 6-2 are schematic drawings illustrating a third frequency hopping rule provided in an embodiment of the present invention;

FIG. 7-1 is a schematic drawing illustrating different antenna groups using different code resources;

FIG. 7-2 is a schematic drawing illustrating different antenna groups using a same code resource in an embodiment of the present invention;

DETAILED DESCRIPTION OF THE INVENTION

The technical solutions in the embodiments of the present invention are described hereinafter clearly and fully, with reference to accompanying drawings in the embodiments of the present invention. Apparently, the described embodiments are only a part, but not all, of the embodiments of the present invention, based on which all of other embodiments obtained by those of ordinary skill in the art fall into the protection scope of the present invention.

Figure 1:
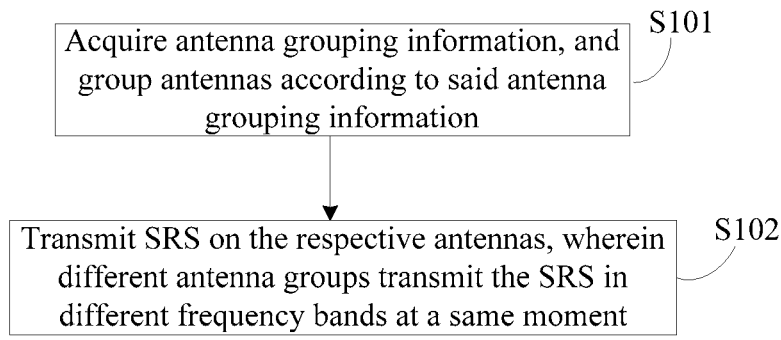
FIG. 1 is a flow chart illustrating the method provided in an embodiment of the present invention.

Referring to FIG. 1, a method for transmitting sounding reference signal in a multi-antenna system provided in the embodiments of the present invention includes the steps as follows.

S101: acquiring antenna grouping information and grouping antennas according to the antenna grouping information; and S102: transmitting SRS on the respective antennas, wherein different antenna groups transmit the SRS in different frequency bands at a same moment.

It can be seen that the embodiments of the present invention group antennas of a UE, and different antenna groups may transmit SRS in different frequency bands at a same moment, thereby avoiding too strong interference with an adjacent cell in a certain frequency band and guaranteeing stability of system. For example, in LTE-Advanced (Long Term Evolution-Advanced, Long Term Evolution-Advanced) systems, a UE can transmit SRS from at most 4 antennas. Then the UE may group the 4 antennas, suppose grouping into 2 groups, where the first group consists of the first and the second antennas, and the second group consists of the third and the fourth antennas. Thus at a same moment, the first and the second antennas transmit SRS in frequency band 1, and the third and the fourth antennas transmit SRS in frequency band 2. Of course, in order to avoid interference between the respective antennas of a same group, orthogonal codes may be utilized, i.e., the first and second antennas are distinguished by different orthogonal codes, and the third and fourth antennas may also be distinguished by different orthogonal codes. After grouping in this manner, if a UE is close to a base station of an adjacent cell, the interference with the SRS received by the base station of the adjacent cell in a certain frequency band is also reduced. Take the foregoing as an example, suppose that at one moment, the first and the second antennas transmit SRS in frequency band 1, and the third and the fourth antennas transmit SRS in frequency band 2; meanwhile, the base station of the adjacent cell also receive SRS in frequency band 1, then only the first and the second antennas of the UE interfere with the base station of the adjacent cell, which reduces by half of the interference as compared with that in the method in the related art. Of course, other grouping methods may also be used to group antennas in other embodiments, for example, grouping into 4 groups and thus the interference is further halved. Besides, the number of antennas is not limited to 4 in actual practice, and the specific method may be executed similarly and will not be described redundantly herein.

In other words, the antennas have been grouped, and different groups of antennas transmit SRS in different frequency bands at a same moment, therefore, even if interference with a base station of an adjacent cell is caused, only one antenna group would cause the interference, thereby avoiding the situation that all the antennas simultaneously interfere with the base stations of the adjacent cell.

In order to enable a base station to acquire the channel states of antennas, as many as possible, of a same UE in one of the frequency bands at a same moment, the antennas of a same group may transmit SRS in a same frequency band at a same moment. In this case, in order to avoid that the respective antennas of a same group interfere with each other, different orthogonal codes need to be configured for the respective antennas of the same group.

Of course, different antenna groups transmit SRS in different frequency bands at a same moment and they will not interfere with each other, so orthogonal codes need not to be configured. It can be seen that a base station needs to acquire antenna grouping information in advance, and assigns orthogonal codes to the respective antennas according thereto. As a result, a UE does not arbitrarily group antennas. To this end, it may be accomplished by the following methods where the antenna grouping information may be fixedly stored on a UE side and on a base station side; or a base station can transmit signalling to a UE to inform the UE of antenna grouping information before the UE transmits SRS.

For example, the antenna grouping information being fixedly stored on a UE side and on a base station side is equivalent to that the UE and the base station have negotiated the grouping condition in advance, the UE saved the antenna grouping information, and the base station side also knew the antenna grouping information, thus the UE can directly retrieve the antenna grouping information stored locally and group the antennas according to the information. For example, when the UE can transmit SRS from at most 4 antennas, it automatically sets the 4 antennas into 2 groups according to the pre-stored antenna grouping information, for example, the first and the third antennas are grouped as the first group, and the second and the fourth antennas are grouped as the second group, thus at a same moment, both the first and the third antennas transmit SRS in frequency band 1, and both the second and the fourth antennas transmit SRS in frequency band 2. Correspondingly, the base station receives the SRS of the first and third antennas in frequency band 1 and receives the SRS of the second and fourth antennas in frequency band 2.

Similarly, when the antenna grouping information is transmitted by a base station, apparently, a UE performs grouping according to the instruction transmitted from the base station, and the base station certainly acquired the antenna grouping information before the UE performs grouping. For example, when the UE can transmit SRS from at most 4 antennas, the base station may transmit signalling to the UE to inform the UE of grouping the 4 antennas into 2 groups for transmitting, such as, for example, the first and the third antennas are grouped as the first group, and the second and the fourth antennas are grouped as the second group, and at a same moment, both the first and the third antennas transmit SRS in frequency band 1, and both the second and the fourth antennas transmit SRS in frequency band 2. Correspondingly, the base station receives the SRS of the first and third antennas in frequency band 1, and receives the SRS of the second and fourth antennas in frequency band 2.

Some parameters are needed in the process of transmission of SRS by a UE, so a step of determining the parameters of transmitting SRS on each antenna group may be further included before transmitting SRS on each antenna, wherein specific values of the parameters usually need to be transmitted from a base station to the UE. In order to save signalling of the base station, the values of part of the parameters used by all antenna groups of a UE may be the same, in which case the base station only needs to transmit to the UE for one time, and then the UE applies these parameter values to all the antenna groups for transmitting SRS. Generally, these parameters may include cell-specific (cell-specific) sounding total bandwidth, UE-specific (UE-specific) sounding total bandwidth, frequency hopping mode, period of SRS, cyclic frequency hopping rule among different branches, and one or more of SRS combs.

The cell-specific sounding total bandwidth is used to control the maximum bandwidth that can be sounded by all the UEs. For example, in LTE systems, a base station may transmit broadcast signalling $C_{SRS}$ to a UE for controlling the maximum bandwidth that can be sounded by all the UEs. For example, when the bandwidth of a system is 20 MHz, $C_{SRS}=2$ represents that the cell-specific sounding total bandwidth is 80 PRBs (Physical Resource Block, physical resource block).

The UE-specific sounding total bandwidth is used to control the total bandwidth sounded by a certain UE. For example, in LTE systems, a base station may transmit signalling $B_{SRS}$ to a certain UE for controlling the sounding total bandwidth of the UE. For example, when the bandwidth of a system is 20 MHz and $C_{SRS}=2$, $B_{SRS}=0$ represents that the UE-specific sounding total bandwidth is 80 PRBs.

Figure 2:
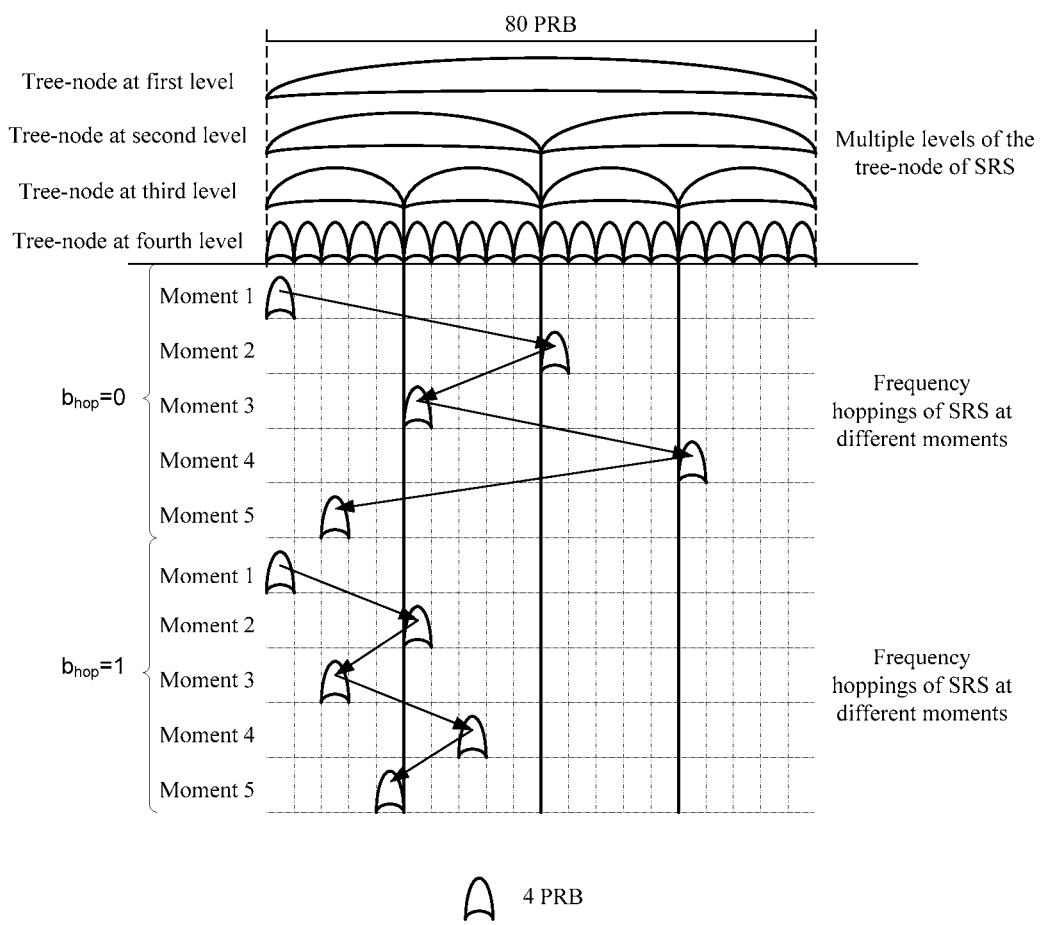
FIG. 2 is a schematic drawing illustrating the cyclic frequency hopping rules among different branches.

The frequency hopping mode is used to control the frequency hopping scope of a UE. For example, in LTE systems, a base station can change the frequency hopping scope of a SRS of a UE through changing the frequency hopping mode. As illustrated in FIG. 2, a base station transmits signalling $b_{hop}$ to a UE. When $b_{hop}=0$, SRS transmitted by the UE may hop within 80 PRBs; when $b_{hop}=1$, SRS transmitted by the UE may hop within 40 PRBs.

The period of SRS is used to control the period of a UE to transmit SRS. For example, in LTE systems, the period of a UE to transmit SRS may be transmitting SRS once every two TTIs (Transmission Time Interval, transmission time interval).

The cyclic frequency hopping rule among different branches is used to control the frequency hopping rule of a UE to transmit SRS. For example, as shown in FIG. 2, in LTE systems, there are 4 levels of tree-node in total for a UE to transmit SRS, wherein each branch at the first level includes 80 PRBs, each branch at the second level includes 40 PRBs, each branch at the third level includes 20 PRBs, and each branch at the fourth level includes 4 PRBs. There are two branches at the second level following each of the branches at the first level, there are two branches at the third level following each of the branches at the second level, and there are five branches at the fourth level following each of the branches at the third level. In this system, the frequency hopping rule is as follows. Suppose that the tree-node at the $i^{th}$ level includes N(i) branches at the $i^{th}$ level, and the SRS transmitted by a UE is on the R(i)$^{th}$ branch of the tree-node at the $i^{th}$ level; the SRS transmitted by the UE performs the frequency hopping according to the tree-node at the highest level at first, and when the N(i)$^{th}$ frequency hopping is finished, on the tree-node at the (i+1)$^{th}$ level, the UE updates to transmit SRS on the R'(i+1)$^{th}$ branch, and so on. N(i) and R(i) have a corresponding expression formula, respectively, and different formulas represent different frequency hopping rules. The concrete expressions will not be described redundantly herein.

As depicted in FIG. 2, when $b_{hop}=0$, at moment 1, SRS transmitted by a UE is on the first branch of the tree-node at the $i^{th}$ level (i=1, 2, 3, 4), i.e., the corresponding branches of the tree-node at each level are (1, 1, 1, 1), respectively.

Immediately after one frequency hopping finishes, at moment 2, on the tree-node at the second level, the UE updates to transmit SRS on the second branch, and the branches on the tree-node at the third and fourth levels remain the same, i.e., the corresponding branches on the tree-node at each level are (1, 2, 1, 1), respectively. In other words, in FIG. 2, it is the 41$^{st}$ PRB for transmitting SRS at moment 2, which PRB belongs to the first branch of the tree-node at the first level, belongs to the second branch of the tree-node at the second level following the first branch of the tree-node at the first level, belongs to the first branch of the tree-node at the third level following the second branch of the tree-node at the second level, and belongs to the first branch of the tree-node at the fourth level following this branch of the tree-node at the third level.

Immediately after two frequency hoppings finishes, at moment 3, on the tree-node at the third level, the UE updates to transmit SRS on the second branch, and on the tree-node at the second level, back to the first branch at moment 1 to transmit SRS, i.e., the corresponding branches of the tree-node at each level are (1, 1, 2, 1), respectively;

Immediately after three frequency hoppings finishes, at moment 4, based on the moment 3, on the tree-node at the second level, the UE updates to transmit SRS on the second branch, i.e., the corresponding branches of the tree-node at each level are (1, 2, 2, 1), respectively;

Immediately after four frequency hoppings finishes, at moment 5, each of branches of the tree-node at the second and third levels has been traversed. As a result, the branches of the tree-node at the fourth level start to be updated. As depicted in FIG. 2, the corresponding branches of the tree-node at each level are (1, 1, 1, 3), respectively, and so on.

The SRS comb is used to control numbers the subcarriers for a UE to transmit SRS. For example, one PRB includes 12 subcarriers, and the SRS comb being 0 represents that the UE transmits SRS on the $0^{th}$, $2^{nd}$, $4^{th}$, $6^{th}$, $8^{th}$ and $10^{th}$ subcarriers of a certain PRB, and the SRS comb being 1 represents that the UE transmits SRS on the $1^{st}$, $3^{rd}$, $5^{th}$, $7^{th}$, $9^{th}$, and $11^{th}$ subcarriers of a certain PRB.

Of course, other parameters may also need to be determined besides the above-mentioned parameters, including a starting point of frequency hopping and the like. As different antenna groups need to transmit SRS in different frequency bands, it is impossible that all the parameter values are the same. For example, the above-mentioned starting points of frequency hopping may be different. A base station may transmit the respective starting points to a UE respectively. Of course, in the case where starting points of frequency hopping are different, the frequency hopping rules used by the respective antenna groups may be the same or not. Several methods for configuring frequency hopping rules among different antenna groups are outlined in the embodiments of the present invention and will be introduced hereinafter respectively.

Figures 1, 3:
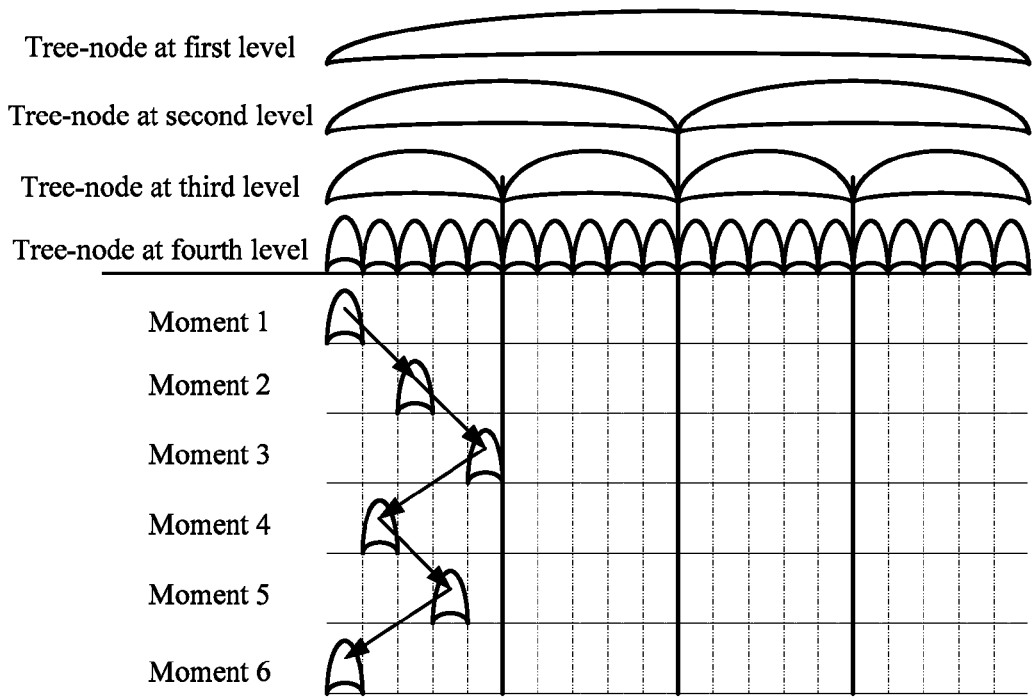
Figures 2, 3:
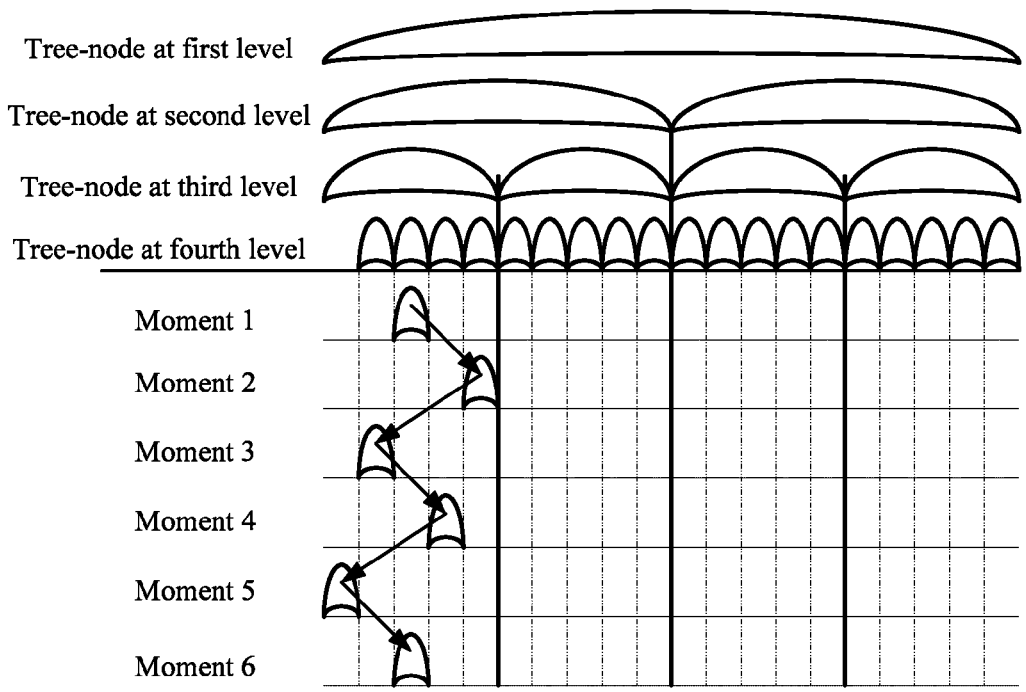

In Method 1, the frequency hopping rules used by different antenna groups have a fixed cyclic offset in time. In this case, a standard frequency hopping rule can be acquired, and the frequency hopping rules of the respective antenna groups can be obtained by cyclically offsetting in time based on the standard frequency hopping rule, i.e., making the frequency bands in which the respective antenna groups transmit SRS have cyclic offsets in time. If there are only two antenna groups, the standard frequency hopping rule can be just used as frequency hopping rule of one antenna group, and the result after the cyclic offset in time is added to the standard frequency hopping rule be used as frequency hopping rule of the other antenna group. For example, when 4 antennas of a UE are grouped into 2 groups, and it is supposed that the standard frequency hopping rule is to perform frequency hopping on the $5^{th}$ branch of the tree-node at the $4^{th}$ level, and the cyclic frequency hopping rule is branch 1, branch 3, branch 5, branch 2 and branch 4, then as shown in FIG. 3-1, at moment 1-6, the frequency hopping order of the first antenna group is branch 1, branch 3, branch 5, branch 2, branch 4 and branch 1, and as shown in FIG. 3-2, the frequency hopping order of the second antenna group is obtained by performing one-bit cyclic offset on the frequency hopping rule of the first antenna group, i.e., branch 3, branch 5, branch 2, branch 4, branch 1 and branch 3. Certainly, the frequency hopping rules of the respective antenna groups can also be obtained by separately adding respectively-used fixed cyclic offset values based on the standard frequency hopping rule, or other specific implementations can also be adopted and no limitation is set herein.

The standard frequency hopping rule may be transmitted from a base station to a UE, and the value of the cyclic offset can be preset on the UE side and the base station side. For example, the value of the cyclic offset is 1, and this value is fixedly set on the UE side and the base station side, thus the base station does not need to inform the UE by signalling, leading to an advantage of easy implementation. Further, this value may be related to the number of all the frequency bands in which SRS hops or to the number of antenna groups, such as being equal to floor($N_{hop}/N_{ant}$), wherein $N_{hop}$ denotes the number of all the frequency bands in which SRS hops, $N_{ant}$ denotes the number of antenna groups, and floor( ) denotes rounding down to the nearest integer. For example, as illustrated in FIG. 3, $N_{hop}$=5 and $N_{ant}$=2, then the value of the cyclic offset is equal to 2.

Or, the value of the cyclic offset can be configured by transmitting signalling from a base station to a UE. For example, a base station informs a UE of the information that the value of the cyclic offset is 1, and the UE transmits SRS on different antenna groups according to this cyclic offset value. In other words, the base station only needs to transmit the frequency hopping rules to the UE once, and simultaneously transmit a value of the cyclic offset, rather than transmitting the frequency hopping rules twice. As the data volume of the cyclic offset values is much smaller than that of the frequency hopping rules, resources for downlink signalling can be saved.

It is noted that "different antenna groups use a same frequency hopping rule and perform cyclically offsetting in time" is equivalent to "the starting frequency bands of the frequency hoppings of different antenna groups have a certain offset", or "different starting frequency bands of the frequency hoppings are set for different groups of antennas". As shown in FIG. 3-1, this process is equivalent to setting the starting frequency band of the frequency hopping for the first antenna group to be branch 1 on the tree-node at the fourth level, and setting the starting frequency band of the frequency hopping for the second antenna group to be branch 3 on the tree-node at the fourth level, and performing frequency hopping according to a same frequency hopping rule. For example, in LTE systems, the starting frequency band of the frequency hopping may be set through a parameter of $n_{RRC}$; wherein the first antenna group uses $n_{RRC}$=1 and the second antenna group uses $n_{RRC}$=3.

In Method 2, the frequency bands in which different antenna groups transmit SRS are different branches on the tree-node at one level or several levels.

Figures 1, 4:
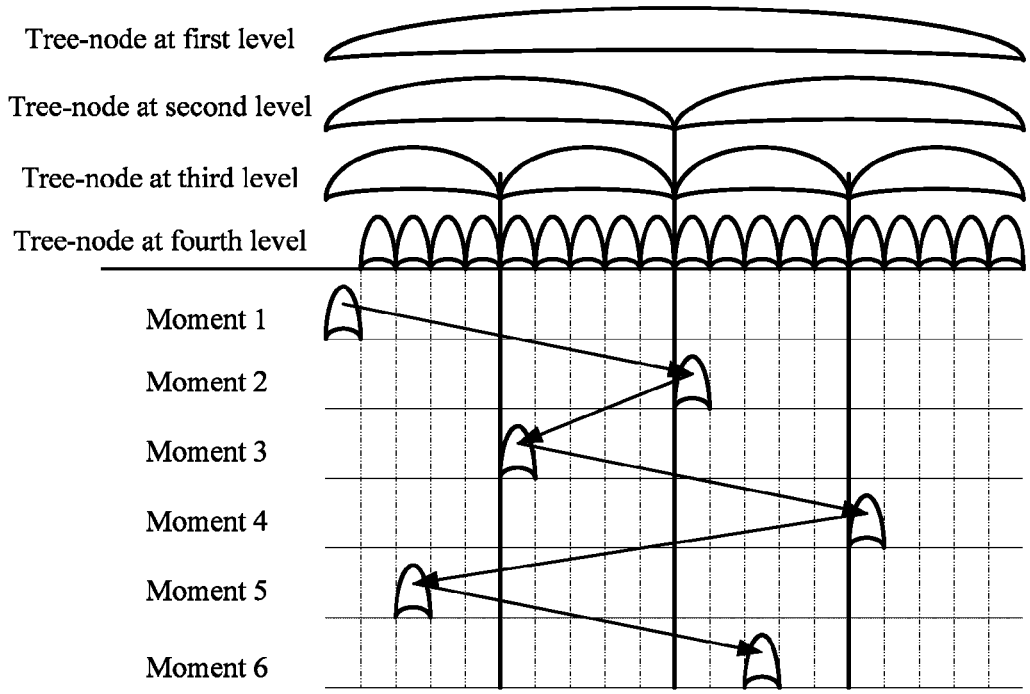
Figures 2, 4:
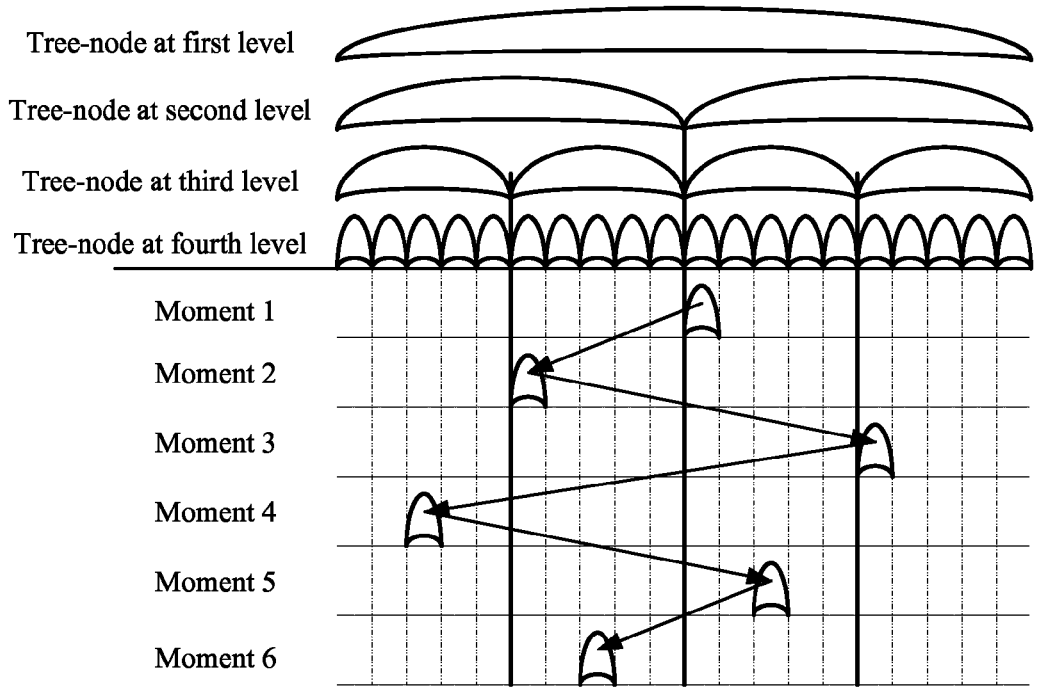

In this method, there may be also a standard frequency hopping rule, and it may be specified at which level(s) the branches on the tree-node the frequency hopping rules used by the respective antenna groups are different, i.e., making the frequency bands in which the respective antenna groups transmit SRS to be different branches on the tree-node at the specified levels. For example, as illustrated in FIG. 4-1 and FIG. 4-2, the frequency bands in which the first antenna group and the second antenna group transmit SRS are different branches on the tree-node at the second level, wherein at the first moment, the frequency bands in which the first antenna group and the second antenna group transmit SRS are the first and the second branches of the tree-node at the second level, respectively, and at the second moment, the frequency bands in which the first antenna group and the second antenna group transmit SRS are the second and the first branches of the tree-node at the second level, respectively, and so on.

Figures 1, 5:
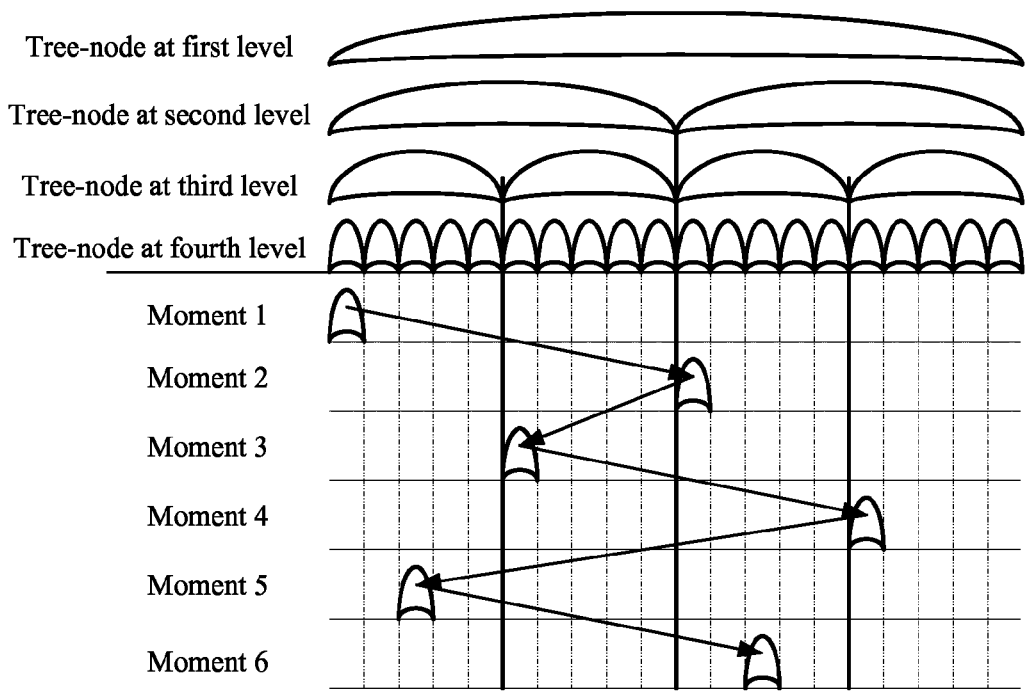
Figures 2, 5:
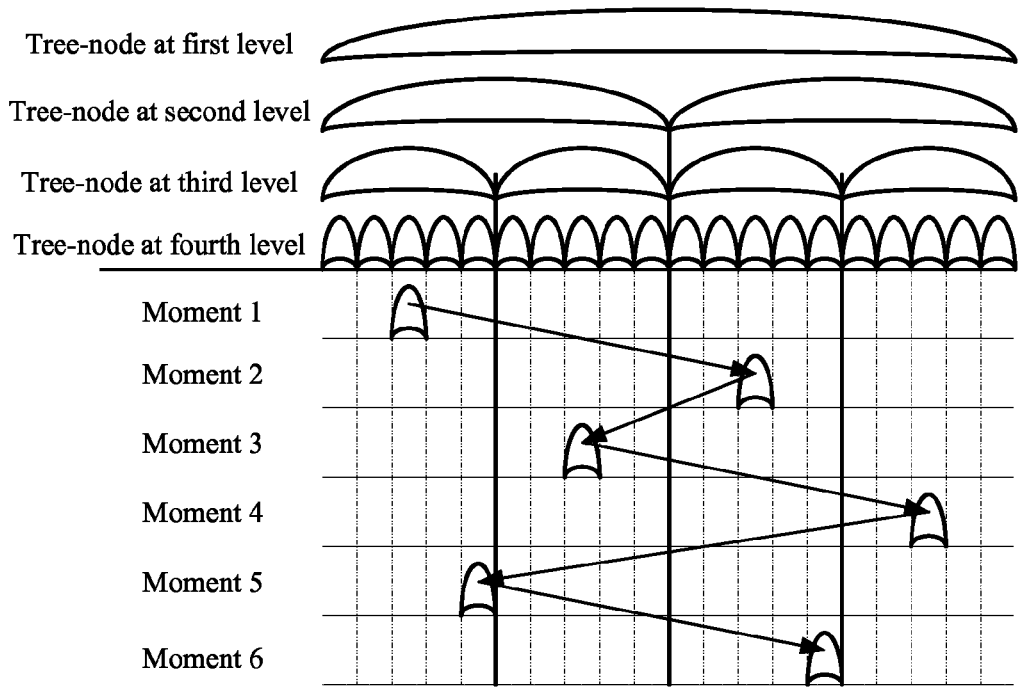

For another example, as depicted in FIG. 5-1 and FIG. 5-2, the frequency bands in which the first antenna group and the second antenna group transmit SRS are different branches on the tree-node at the fourth level, wherein at the first moment, the frequency bands in which the first antenna group and the second antenna group transmit SRS are the first and the third branches of the tree-node at the fourth level, respectively, and at the fifth moment, the frequency bands in which the first antenna group and the second antenna group transmit SRS are the third and the fifth branches of the tree-node at the fourth level, respectively, and so on.

It may be pre-set on the UE side and the base station side at which level(s) of the tree-node the frequency hopping rules used by the respective antenna groups are different. For example, as shown in FIG. 5-1 and FIG. 5-2, the difference is on the tree-node at the lowest level.

Or, it may be configured by the base station transmitting signalling to the UE at which level(s) of the tree-node the frequency hopping rules used by the respective antenna groups are different. For example, a base station may transmit signalling to a UE to inform the UE that the frequency bands in which different antenna groups transmit SRS are different on the fourth node, and then the UE transmits the SRS of different antenna groups in different frequency bands as illustrated in FIG. 5-1 and FIG. 5-2.

Certainly, after it is determined at which level(s) of the tree-node the frequency hopping rules used by the respective antenna groups are different, the offsets of the branches on the tree-node at the level(s), of the frequency hopping rules used by different antenna groups are further needed to be determined, wherein the offsets of the branches on the tree-node at the level(s), of the frequency bands in which different antenna groups transmit SRS can be preset on the UE side and on the base station side. For example, the offset of a branch is 2, and this value is fixedly set on the UE side and on the base station side, thus the base station does not need to inform the UE by signalling, leading to an advantage of easy implementation. Further, this value may be related to the number of branches on the tree-node or the number of antenna groups, such as being determined by floor($N_{branch}/N_{ant}$), wherein $N_{branch}$ denotes the number of branches on a certain tree-node. For example, as illustrated in FIG. 5-1 and FIG. 5-2, $N_{branch}$=5 and $N_{ant}$=2, then the value of the cyclic offset equals to 2.

Or, the above-described offset value of branches can also be configured by transmitting signalling from a base station to a UE. For example, a base station informs a UE of the information that the offset value of a branch is 2, and then the UE transmits SRS of different antenna groups in different frequency bands according to this offset value.

In Method 3, the frequency bands in which different antenna groups transmit SRS have a fixed cyclic frequency offset.

Figures 1, 6:
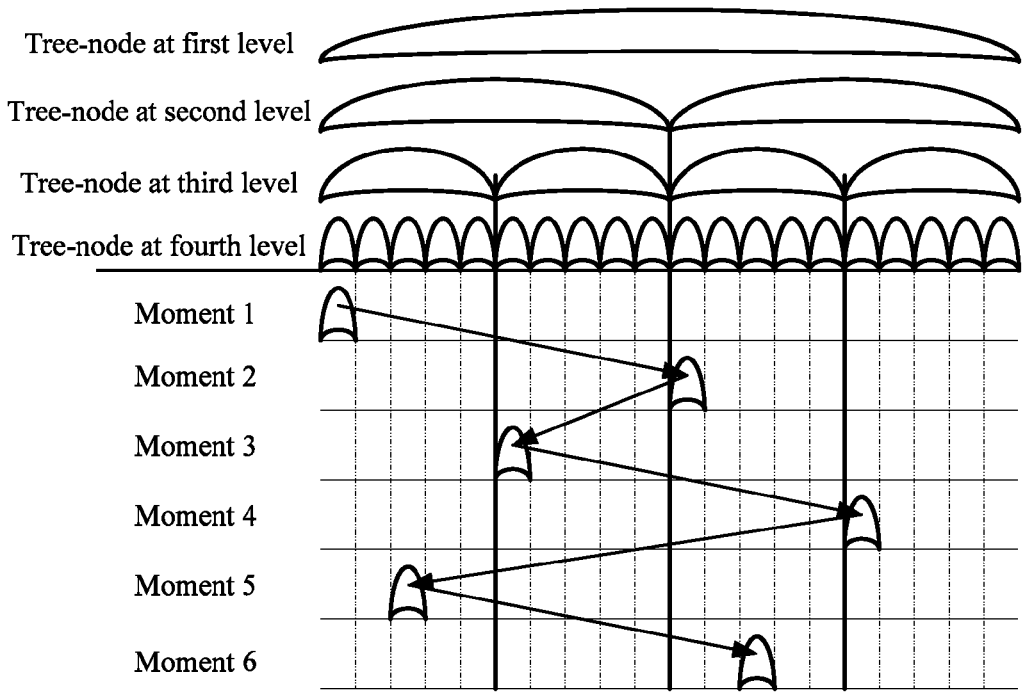
Figures 2, 6:
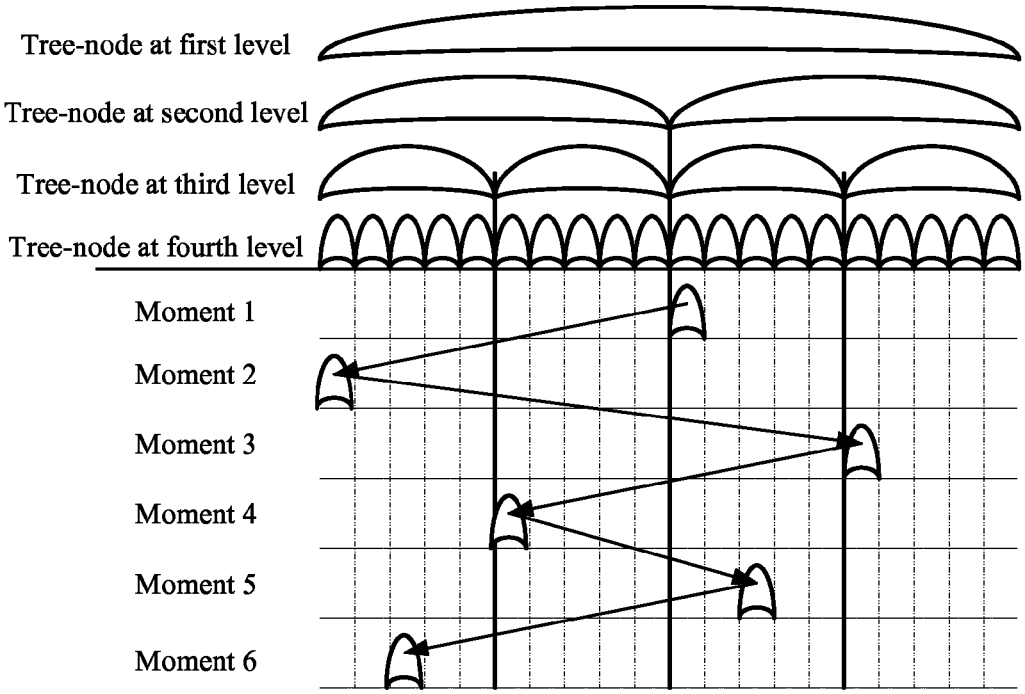

For example, as depicted in FIG. 6-1 and FIG. 6-2, the frequency bands in which the first antenna group and the second antenna group transmit SRS have a fixed cyclic frequency offset of 40 PRBs throughout. Thus at moment 1, the frequency band in which the first antenna group transmits SRS is the first to the fourth PRBs, and the frequency band in which the second antenna group transmits SRS is the $41^{st}$ to the $44^{th}$ PRBs, and at moment 6, the frequency band in which the first antenna group transmits SRS is the $49^{th}$ to the $52^{nd}$ PRBs, and the frequency band in which the second antenna group transmits SRS is the $9^{th}$ to the $12^{th}$ PRBs, and so on. That is, the frequency bands in which the respective antenna groups transmit SRS have a cyclic offset in frequency.

Similarly, the fixed cyclic frequency offset between the frequency bands in which different antenna groups transmit SRS can be preset on a UE side and on a base station side. For example, the cyclic frequency offset is 40 PRBs, and this value is fixedly set on the UE side and on the base station side, thus the base station does not need to inform the UE by signalling. The value of the cyclic frequency offset may be related to the total sounding bandwidth or the number of antenna groups, such as being equal to floor($N_{BW}/N_{ant}$), wherein $N_{BW}$ denotes the number of PRBs included in the total sounding bandwidth. For example, in FIG. 6-1 and FIG. 6-2, $N_{BW}$=80, $N_{ant}$=2, then the value of the cyclic frequency offset equals to 40.

Or, the fixed cyclic frequency offset between the frequency bands in which different antenna groups transmit SRS can be configured by transmitting signalling from a base station to a UE. For example, the base station informs the UE of the information that the cyclic frequency offset is 40 PRBs, and then the UE transmits SRS of different antenna groups in different frequency bands according to the cyclic frequency offset.

Detailed description on the frequency hopping rules used by different antenna groups is made hereinbefore, and other methods may also be used in other embodiments and no limitation is set herein.

As described above, the antennas in a same group will transmit SRS in a same frequency band at a same moment, and thus they need to be distinguished by utilizing different orthogonal codes; while different antenna groups will not transmit SRS in a same frequency band at a same moment, thus the code resources used by different antenna groups may be the same, wherein the code resources include orthogonal code sequences, cyclic shift resources, and the like.

Figures 1, 7:
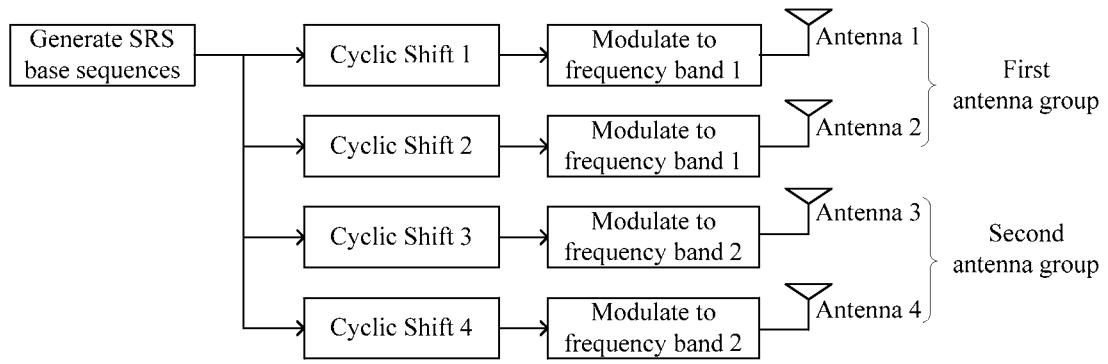
Figures 2, 7:
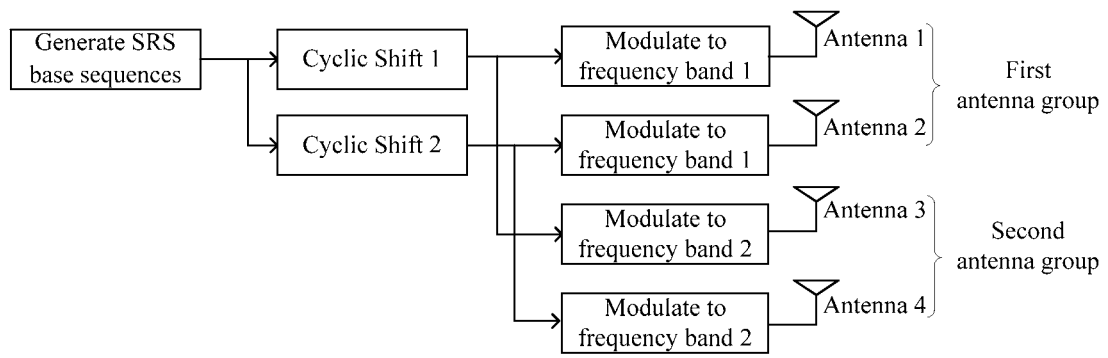

When each antenna transmits a SRS, it at first needs to generate a SRS base sequence, and then perform a cyclic shift, and at last modulate to a corresponding frequency band to generate the SRS. If the cyclic shift resources used by different antenna groups are different from each other, as illustrated in FIG. 7-1, the SRS transmitted by antennas 1, 2, 3 and 4 need to use the cyclic shifts 1, 2, 3 and 4, and the UE needs to take 4 cyclic shift operations in total. While, if as shown in FIG. 7-2, different antenna groups use the same cyclic shift resources, i.e., the SRSs transmitted by antennas 1 and 2 use cyclic shifts 1 and 2, and the SRSs transmitted by antennas 3 and 4 use cyclic shifts 1 and 2 as well, then the UE only needs to take 2 cyclic shift operations, which can reduce complexity of the UE.

Also, the same code resources used by different groups of antennas can be preset on a UE side and on a base station side, leading to an advantage that the base station does not need to inform the UE by signalling, and it is easy to be achieved. Or, the same code resources used by different groups of antennas can also be configured by transmitting signalling from a base station to a UE, leading to an advantage of flexible configuration of the base station.

In various specific methods mentioned above, many descriptions involve the situation of informing a UE of specific information by transmitting signalling from a base station to the UE, such as original antenna grouping information, or time offset value in frequency hopping rules, branch offset value, frequency offset value, code resources, or so on. In specific implementations, the above-described signalling may be informed to the UE in a half-static way, i.e., the UE would perform relevant operations with the previously received instructions until reception of a new instruction. For example, the UE would group the antennas with the previously received antenna grouping information until reception of new antenna grouping information from the base station, and so on. Or the above-mentioned signalling may also be informed to the UE in a dynamic way, i.e., the base station needs to send a instruction to the UE for controlling the UE to perform relevant operations before the UE transmits SRS every time.

The above-described instruction may be informed by a base station to a single UE by way of unicast, and may also be informed by a base station to several UEs by way of multicast, or may be informed by a base station to all the UEs in the cell by way of broadcast. In addition, the above-described signalling can be transferred from a base station to a UE through PDCCH (Physical Downlink Control Channel, physical downlink control channel), PDSCH (Physical Downlink Shared Channel, physical downlink shared channel) or BCH (Broadcasting Channel, broadcasting channel).

In conclusion, the embodiments of the present invention enable different antenna groups of a UE to transmit SRS in different frequency bands through grouping antennas of a UE into multiple antenna groups, thereby avoiding too strong interference with the adjacent cell in a certain frequency band, and guaranteeing stability of the system.

Figure 8:
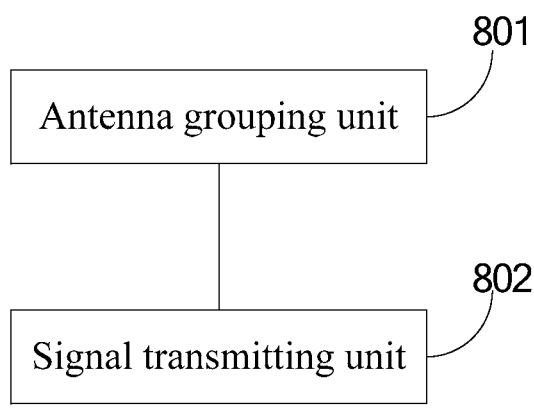
FIG. 8 is a schematic drawing illustrating a first device provided in an embodiment of the present invention.

In correspondence with the methods for transmitting sounding reference signal in a multi-antenna system provided by the embodiments of the present invention, a device for transmitting sounding reference signal in a multi-antenna system is also provided by the embodiments of the present invention. Referring to FIG. 8, the device includes an antenna grouping unit 801 for acquiring antenna grouping information and grouping antennas according to the antenna grouping information; and a signal transmitting unit 802 for transmitting SRS on the respective antennas, wherein different antenna groups transmit SRS in different frequency bands at a same moment.

Of course, in order to enable a base station to acquire the channel states of antennas, as many as possible, of a same UE in one of the frequency bands at a same moment, when the signal transmitting unit 802 transmits SRS on the respective antennas, the antennas in a same group may transmit SRS in a same frequency band.

Figure 9:
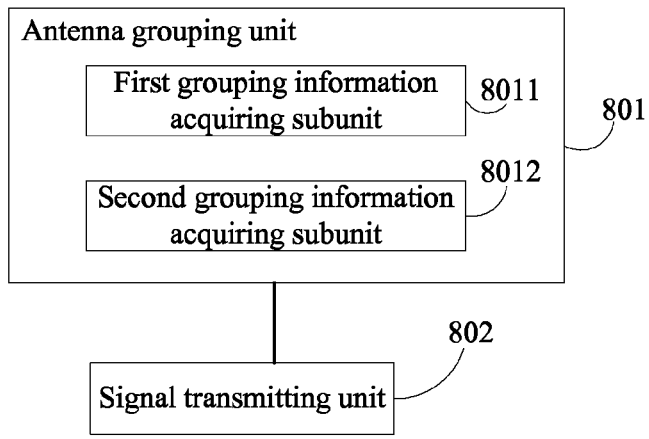
FIG. 9 is a schematic drawing illustrating a second device provided in an embodiment of the present invention.

The above-described antenna grouping information can be stored locally and on a base station side. Accordingly, referring to FIG. 9, the antenna grouping unit 801 includes a first grouping information acquiring subunit 8011 for acquiring the antenna grouping information stored locally.

The antenna grouping subunit 801 may otherwise include a second grouping information acquiring subunit 8012 for receiving signalling transmitted from the base station side and acquiring the antenna grouping information from the signalling.

In practical application, parameters for the respective antenna groups to transmit SRS are needed to be determined before transmitting SRS on the respective antennas, thus the device may also include a parameter determining unit 803 for determining the parameters for the respective antenna groups to transmit SRS before transmitting SRS on the respective antennas In order to save signalling on a base station side, the parameter determining unit 803 may specifically acquire a part or all of the same parameters, wherein the parameters include at least one of a cell-specific sounding total bandwidth, a user equipment UE-specific sounding total bandwidth, a frequency hopping mode, a transmission period of SRS, a frequency hopping rule among different branches and a SRS comb. The above-described parameters have been described in detail in the preceding embodiments, and will not be described redundantly herein.

Figure 10:
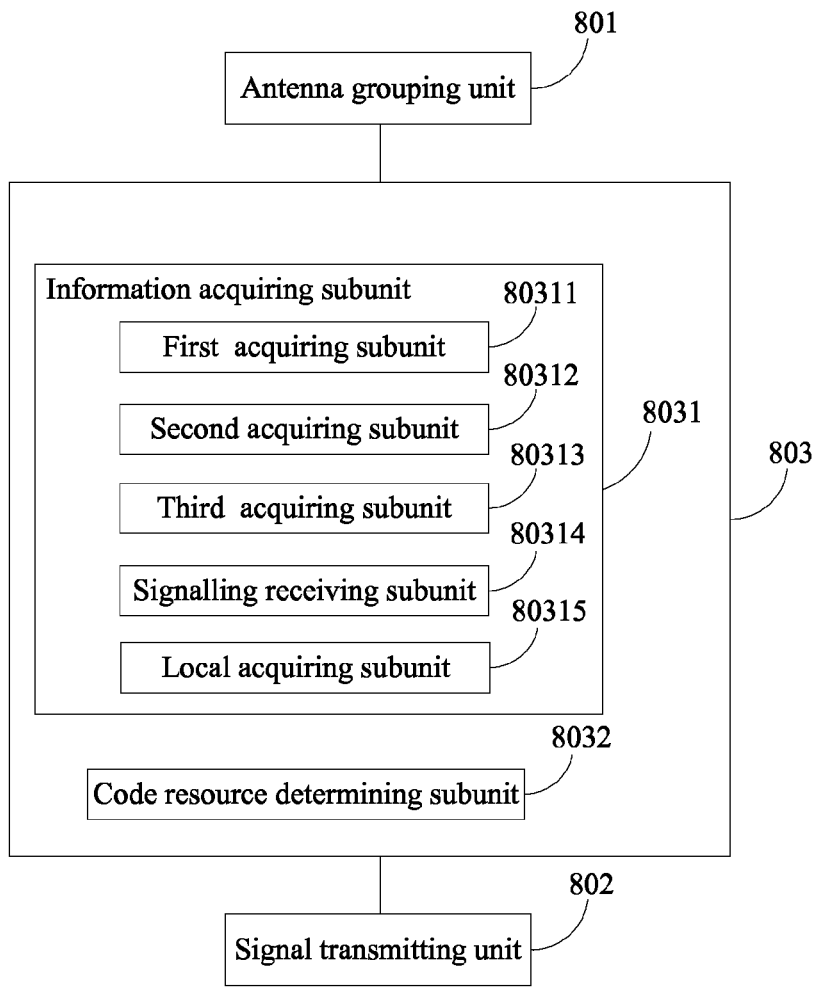
FIG. 10 is a schematic drawing illustrating a third device provided in an embodiment of the present invention.

When determining the parameters for transmitting SRS, the frequency hopping rule used by the respective antenna groups is an important aspect. Accordingly, referring to FIG. 10, the parameter determining unit 803 may include an information acquiring subunit 8031 for acquiring relevant information on frequency hopping rules of the respective antenna groups and determining the frequency hopping rules of the respective antenna groups according to the relevant information on the frequency hopping rules.

Specifically, the information acquiring subunit 8031 may include a first acquiring subunit 80311 for acquiring a standard frequency hopping rule and a cyclic offset value in time, and determining the frequency hopping rules of the respective antenna groups according to the standard frequency hopping rule and the cyclic offset value in time, so that the frequency bands in which the respective antenna groups transmit SRS have a cyclic offset in time; or a second acquiring subunit 80312 for acquiring a standard frequency hopping rule and tree-node at a specified level, as well as a branch offset value on the tree-node at the specified level, and determining the frequency hopping rules of the respective antenna groups according to the standard frequency hopping rule, tree-node at the specified level and branch offset value, so that the frequency bands in which the respective antenna groups transmit SRS are different branches on the tree-node at the specified level; or a third acquiring subunit 80313 for acquiring a standard frequency hopping rule and a cyclic offset value in frequency, and determining the frequency hopping rules of the respective antenna groups according to the standard frequency hopping rule and the cyclic offset value in frequency, so that the frequency bands in which the respective antenna groups transmit SRS have a cyclic offset in frequency.

The specific information may be acquired from a base station, in which case the information acquiring subunit 8031 includes a signalling receiving subunit 80314 for receiving signalling transmitted from a base station side, and acquiring relevant information on frequency hopping rules of the respective antenna groups from the signalling.

Or, the relevant information on frequency hopping rules of the respective antenna groups may also be stored locally and on the base station side, in which case the information acquiring subunit 8031 includes a local acquiring subunit 80315 for acquiring the relevant information on frequency hopping rules of the respective antenna groups stored locally.

In addition, the parameter determining unit 803 may further include a code resource determining subunit 8032 for determining a same code resource for the respective antenna groups.

Those of ordinary skill in the art can understand that all or part of the steps in the above-described embodiment methods may be achieved through a program instructing relevant hardware, and the program may be stored in a computer readable storage medium. The program includes, when being executed, the steps as follows of acquiring antenna grouping information, and grouping antennas according to the antenna grouping information; transmitting SRS on the respective antennas, wherein, at a same moment, different antenna groups transmit SRS in different frequency bands. The storage medium may be, for example, ROM/RAM, magnetic disk, optical disk, and so on.

Detailed description on the methods and the devices for transmitting sounding reference signal in a multi-antenna system provided by the present invention is given hereinbefore, and the specification utilizes some specific examples to illustrate principles and implementations of the present invention. However, the foregoing description on the embodiments is only intended to help understanding of the method and crucial concept of the present invention. Meanwhile, for those of ordinary skill in the art, modifications will be made on either the specific implementations or application scopes based on the concepts of the present invention. In conclusion, the specification shall not be understood as limitation on the present invention.

What is claimed is:

1. A method for transmitting a sounding reference signal (SRS) in a multi-antenna system, comprising:
    acquiring antenna grouping information;
    grouping antennas into antenna groups according to said antenna grouping information;
    acquiring, for each respective antenna group, frequency hopping rule information of the antenna group, wherein the frequency hopping rule information of each antenna group includes a standard frequency hopping rule, a specified level of a tree-node, and a branch offset value at the specified level of the tree-node;
    determining, for each respective antenna group, frequency hopping rules of the antenna group according to the respective frequency hopping rule information of the antenna group; and
    transmitting, based on the respective frequency hopping rules, the SRS on the respective antennas of the antenna groups, wherein different antenna groups transmit the SRS in different frequency bands at a same moment, wherein each frequency band of the different frequency bands includes physical resource blocks (PRBs) corresponding to the frequency band.

2. The method of claim 1, wherein
    the antenna grouping information is stored locally on a base station side, and acquiring the antenna grouping information includes acquiring the antenna grouping information stored locally on the base station side; or
    acquiring the antenna grouping information includes acquiring the antenna grouping information from signaling transmitted from the base station side.

3. The method of claim 1, further comprising: determining a same code resource for the respective antenna groups to transmit the SRS.

4. A device for transmitting a sounding reference signal (SRS) in a multi-antenna system, the device comprising:
    a processor, configured to:
        acquire antenna grouping information,
        group antennas into antenna groups according to the antenna grouping information,
        acquire, for each respective antenna group, frequency hopping rule information of the antenna group, wherein the frequency hopping rule information of each antenna group includes a standard frequency hopping rule, a specified level of a tree-node, and a branch offset value at the specified level of the tree-node, and determine, for each respective antenna group, frequency hopping rules of the antenna group according to the respective frequency hopping rule information of the antenna group; and a transmitter device, configured to transmit based on the frequency hopping rules, the SRS on the respective antennas of the antenna groups, wherein different antenna groups transmit the SRS in different frequency bands at a same moment, and wherein each frequency band of the different frequency bands includes physical resource blocks (PRBs) corresponding to the frequency band.

5. The device of claim 4, wherein the antenna grouping information is stored locally on a base station side, and the processor acquires the antenna grouping information stored locally on the base station side; or the processor receives signaling transmitted from the base station side and acquires the antenna grouping information from the signaling.

6. The device of claim 4, wherein the processor determines a same code resource for the respective antenna groups.

7. The method of claim 1, wherein the antennas in a same antenna group transmit the SRS in a same frequency band.

8. The method of claim 1, wherein the specified level of the tree node is pre-set on a UE side and a base station side.

9. The method of claim 1, wherein the branch offset value is determined by floor ($N_{branch}/N_{ant}$), wherein the $N_{branch}$ denotes a number of branches on the specified level of the tree node, $N_{ant}$ denotes a number of antenna groups, and floor( ) denotes rounding down to the nearest integer.

10. The device of claim 4, wherein the antennas in a same antenna group transmit the SRS in a same frequency band.

11. The device of claim 4, wherein the specified level of the tree node is pre-set on a UE side and a base station side.

12. The device of claim 4, wherein the branch offset value is determined by floor ($N_{branch}/N_{ant}$), wherein the $N_{branch}$ denotes a number of branches on the specified level of the tree node, $N_{ant}$ denotes a number of antenna groups, and floor( ) denotes rounding down to the nearest integer.

* * * * *

UNITED STATES PATENT AND TRADEMARK OFFICE
CERTIFICATE OF CORRECTION

PATENT NO. : 8,873,602 B2  
APPLICATION NO. : 13/653088  
DATED : October 28, 2014  
INVENTOR(S) : Zhou et al.

Page 1 of 1

It is certified that error appears in the above-identified patent and that said Letters Patent is hereby corrected as shown below:

Title Page, Item 71 Applicant, "Guangdong (CN)" should read --Shenzhen (CN)--.

Signed and Sealed this  
Ninth Day of June, 2015

Michelle K. Lee  
*Director of the United States Patent and Trademark Office*